United States Patent [19]
Yoshida

[11] 4,056,942
[45] Nov. 8, 1977

[54] METHOD FOR MOVING BUILT STRUCTURES BY FLOTATION

[75] Inventor: Toshio Yoshida, Kobe, Japan

[73] Assignee: Kawasaki Jukogyo Kabushiki Kaisha, Kobe, Japan

[21] Appl. No.: 683,942

[22] Filed: May 6, 1976

[30] Foreign Application Priority Data

May 13, 1975 Japan .................................. 50-57064

[51] Int. Cl.² .............................................. E02B 1/00
[52] U.S. Cl. ..................................... 61/65; 52/169.7;
  61/1 R; 61/39; 61/49; 220/1 B; 220/18; 4/172
[58] Field of Search ...................... 61/46, 46.5, 49, 39,
  61/1 R, 63, 64, 65; 52/169.7, 169.8, 247, 249;
  4/172; 220/1 B, 18

[56] References Cited
U.S. PATENT DOCUMENTS

| 34,426 | 2/1862 | Howard | 61/46.5 |
|---|---|---|---|
| 2,340,005 | 1/1944 | McKenzie | 61/64 |
| 2,995,015 | 8/1961 | Phelps | 61/64 |
| 3,193,847 | 7/1965 | Mashura | 52/247 |
| 3,316,721 | 5/1967 | Heilig | 52/169.8 |
| 3,464,212 | 9/1969 | Yamagata et al. | 61/46 |
| 3,546,720 | 12/1970 | Hoch et al. | 52/169.7 |
| 3,626,447 | 12/1971 | Hindlin | 61/46.5 |
| 3,735,427 | 5/1973 | Ancewicz et al. | 52/169.7 |

OTHER PUBLICATIONS

"Czeck Float ... " Engineering News-Record, p. 60, 11/13/58.
"Ingenious Way To ... " pp. 126, 127, Popular Science, Oct. 1960.

Primary Examiner—Paul R. Gilliam
Assistant Examiner—Alex Grosz

[57] ABSTRACT

A large, heavy built structure is moved safely and rapidly from a first position to a second position both on a common ground surface by installing on the ground surface a temporary water-retaining wall enclosure surrounding commonly the built structure at the first position and the second position, supplying water into the enclosure thereby to raise the structure by flotation off the ground surface, applying force to move the structure in the raised state to a position immediately above the second position, and draining the water out of the enclosure thereby to cause the structure to descend onto the second position. A buoyant built structure is floated as it is, while a non-buoyant structure is provided with floats. A structure which must not be wetted is built beforehand in a tray-like vessel of sufficient buoyancy.

8 Claims, 10 Drawing Figures

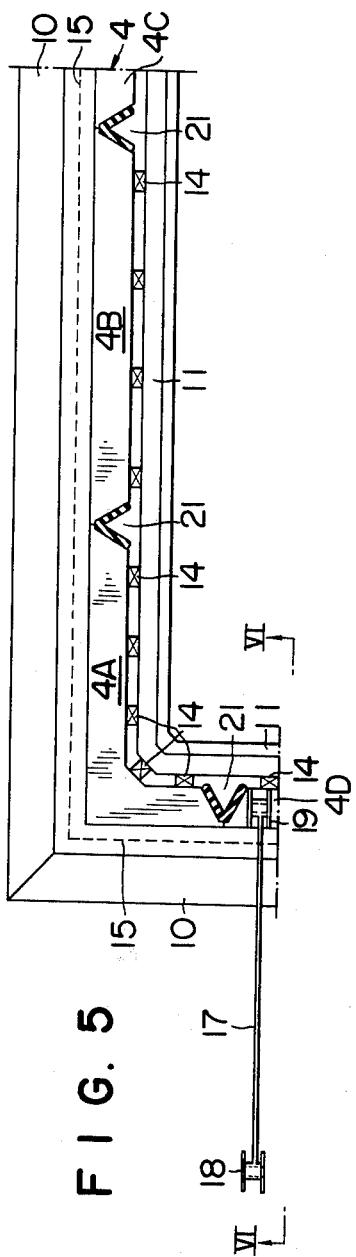
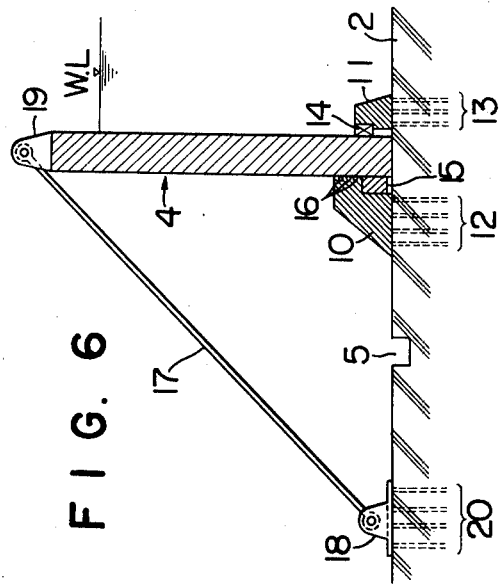

METHOD FOR MOVING BUILT STRUCTURES BY FLOTATION

BACKGROUND OF THE INVENTION

This invention relates generally to techniques in moving and shifting large and heavy objects and more particularly to a novel method and apparatus for moving heavy built structures by flotation thereof.

Heretofore, it has been a common practice in moving large and heavy built structures such as buildings to resort to hoisting and hauling machines such as cranes in instances where such machines can be used.

In the case where a large and heavy built structure (hereinafter referred to simply as "structure") such as a house is to be moved over substantially level ground, a widely used method for this purpose comprises laying spheres or rollers between the structure or a supporting base on which the structure rests and the level ground thereby to reduce the frictional resistance to movement and pulling the structure or its base to the desired position by means of a device such as a winch.

The necessity of shifting heavy structures arises in a wide variety of forms and ways in many fields. However, all of the known moving methods, such as those briefly described above, are based on the principle of supporting the total weight of a structure, and research effort has been directed toward ways and means to reduce frictional resistance at the time of movement of the structure. One of the resulting requirements for this purpose is the smoothening of the frictional surfaces, for which considerably large-scale equipment become necessary, and, moreover, extraordinary precision has been required. Furthermore, it cannot be denied that these known methods have been accompanied by numerous difficulties, especially problems relating to efficiency of moving work and ensuring of safety in the work.

SUMMARY OF THE INVENTION

It is an object of this invention to provide a method for moving large and heavy structures safely and easily to objective positions, particularly by floating these structures on water and moving them in floating state.

Another object of the invention is to provide a method for moving by flotation on water not only structures which are flotable on water but also large and heavy structures which are not flotable on water as they are.

Still another object of the invention is to provide an enclosure of cutoff walls or water-retaining walls suitable for use in the practice of the method for flotation moving on water of a structure as described above, which enclosure of walls does not impose any limitation on the environment of the structural space of the structure and on the work efficiency during this operation and, moreover, can be readily installed and dismantled, and which has no detrimental effect on the necessary flotation moving of the structure.

A further object of the invention is to provide a method of installing the above set forth enclosure of water-retaining walls (hereinafter referred to as walls).

A further object of the invention is to provide a flotation moving method which is efficient and can be practiced at relatively low cost.

According to this invention in one aspect thereof, briefly summarized, there is provided a method for moving a built structure from a first position to a second position both on a common supporting surface, which method comprises installing on the supporting surface a water-retaining wall enclosure to surround commonly the built structure at the first position and the second position, supplying water into the enclosure thereby to raise the built structure by flotation off the supporting surface, applying force to move the built structure in the raised state to a position immediately above the second position, and removing the water out of the enclosure thereby to cause the built structure to descend onto the second position.

In this method, a buoyant built structure is floated as it is, while a non-buoyant structure is provided with auxiliary flotation means. A structure which must not be wetted is built beforehand in a tray-like vessel of sufficient buoyancy.

According to this invention in another aspect thereof, there is provided a method as set forth above in which the wall enclosure is characterised in that it can be readily and rapidly installed and subsequently dismantled and comprises a plurality of wall panels or segments which are joined edge-to-edge at their sides, secured at their foot edges to the supporting surface, and held at their upper parts by brace struts.

The nature, utility, and further features of the invention will be apparent from the following detailed description with respect to preferred embodiments of the invention when read in conjunction with the accompanying drawings, throughout which like parts are designated by like reference numerals.

BRIEF DESCRIPTION OF THE DRAWINGS

In the drawings:

FIG. 5 is a fragmentary plan view showing a corner part of an enclosure of walls;

FIG. 6 is an elevation in vertical section taken along the line VI—VI in FIG. 5 as viewed in the arrow direction.

DETAILED DESCRIPTION

The principle feature of this invention lies in the balancing of the weight of a structure with buoyant force and moving the structure in a state of flotation on water.

Of course, there are some kinds of structures which cannot be floated on water and even some kinds of structures which should not be placed in contact with water or be subjected to immersion in water. In the former case, floats are used to impart only the necessary buoyancy, while in the latter case, the structure is erected beforehand in a tray-like vessel and is thus moved without coming into contact with the water.

If it were merely a matter of moving by flotation on water, the quickest and simplest procedure would be to construct the structure in a dry dock and to introduce water into the dock after the construction thereby to move the structure by flotation. This method, however, would greatly restrict the places to which the structure can be moved. Another important feature of this invention is that this restriction and the limitation of place of construction work are avoided by installing as necessary an enclosure of a walls commonly surrounding the structure and the objective place to which it is to be moved, filling the enclosure with water to float the structure and move the same to the objective position, and thereafter draining the water and dismantling the wall enclosure thereby to leave the construction space in its original dry, level, and obstruction-free state.

Figure 1:
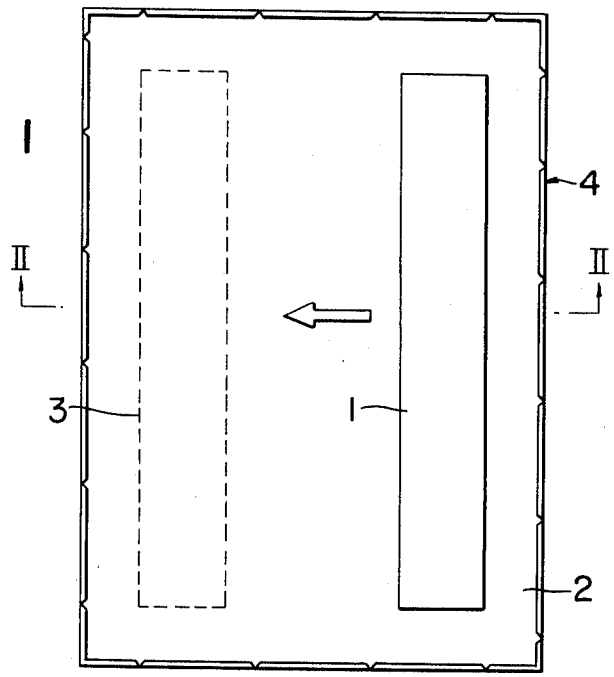
FIG. 1 is a plan view showing a structure and an enclosure of walls for an exposition of the principle of a first moving method according to this invention.
Figure 2:
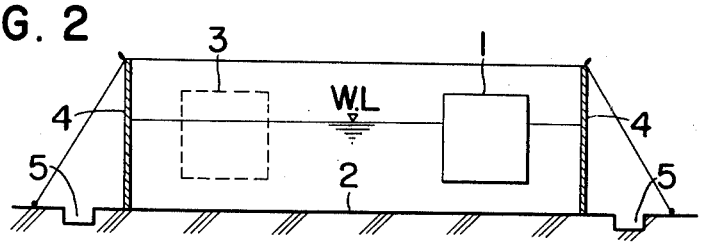
FIG. 2 is an elevation in vertical section taken along the line II—II in FIG. 1 as viewed in the arrow direction.

Referring to FIGS. 1 and 2 indicating the principle of the method of flotation moving a structure 1, the structure 1 is to be moved from a level construction space 2 to an objective position 3. For this purpose, a wall enclosure 4 is assembled around both positions 2 and 3. While a sidewise movement, wherein the structure 1 is moved is moved sidewise between parallel orientations, is illustrated in FIG. 1, the movement need not be so limited. The floor or ground surface of the construction space 2 is required to have strength to withstand the water pressure when the enclosure 4 is filled with water to the level necessary for flotation moving, water resistance, and impermeability to water. Ordinarily, a concrete floor covered with a water-proof film is laid.

The specific details of construction of the wall enclosure 4 commonly and widely surrounding the structure 1 and the objective position 3 and the method of installation thereof will be described hereinafter. A required feature of this wall enclosure 4 is that it be of takedown type which can be readily installed and dismantled. For example, during the period of construction of the structure 1, the wall enclosure 4 is kept in dismantled state so that it will not hinder the work, and only during the moving work, the wall segments or panels are joined in a desired layout to erect the enclosure. Another required feature of this wall enclosure 4 is that, once it has been erected, it will retain watertightness to an extent such as to maintain the water level necessary for flotation moving with the available water supply flow rate although there may be some leakage of water.

As indicated in FIG. 2, the flotation moving method of this invention, in principle, comprises causing the structure 1 to float at the position where it was constructed in water accumulated by supplying water into the wall enclosure 4, moving the structure in its floating state by towing means such as a winch to a position directly above the objective position 3, and then gradually lowering the water level to cause the structure to settle on the ground. Thereafter, the next work process can be started or anchoring of the structure can be carried out.

Furthermore, a drainage trench 5 is dug completely around the outside of the wall enclosure 4 whenever possible for disposal of leakage water and discharge of water after the flotation moving.

Figure 3:
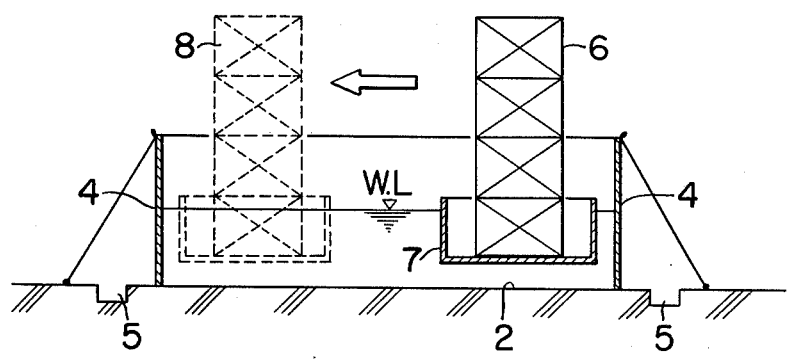
FIGS. 3 and 4 are elevations similar to FIG. 2 respectively for expositions of the principles of second and third methods according to the invention.

In another embodiment of this invention as indicated in FIG. 3, the flotation moving method is applied to a structure 6 which cannot float by itself and, moreover, must be prevented from being immersed in water. In this case, the structure 6 is constructed beforehand in a tray-like vessel 7. This vessel 7 is of pressure resisting and waterproof construction and has a flotation displacement such as to safely carry the structure 6. The succeeding steps of the procedure for floating and moving this vessel 7 and the structure 6 are the same as those described above in connection with the preceding example.

Figure 4:
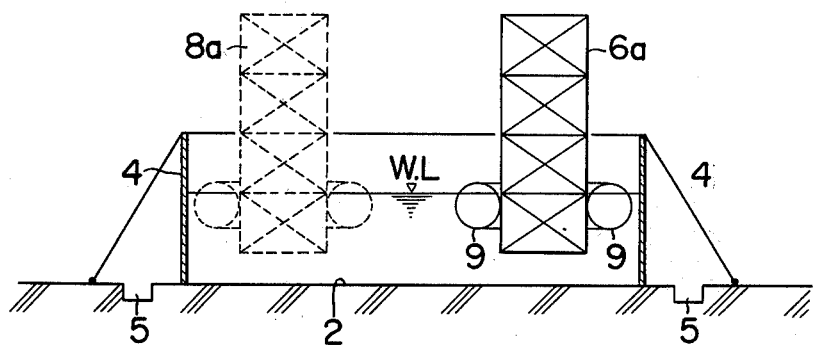

In still another embodiment of this invention as indicated in FIG. 4, the method thereof is applied to a structure 6a which also cannot float by itself but which may be immersed in water without harm. In this case, the structure 6a is constructed in the ordinary manner in the construction space 2. Then, at the time of moving, suitable floats 9 are secured to the lower part of the structure 6a to impart the required buoyancy in water thereto. Thereafter, the same succeeding steps as in the first example are carried out to float and move the structure 6a.

In the practice of the flotation moving method according to this invention, the construction of the wall enclosure 4 and the methods of installing and dismantling this enclosure are important considerations. The method of this invention can be practiced with full effectiveness, of course, in a pool or dock which has already been built or has been specially built. In this sense, the water retaining wall enclosure in the practice of this invention is not necessarily a prefabricated structure intended for temporary erection purposes, and there is no reason for it to be of takedown type. The wall enclosure may be a fixed enclosure of permanently installed type or it may be a combination of a temporary construction type structure and a permanent construction type structure.

One example of a wall enclosure of temporary erection character which can be readily installed and dismantled will now be described with reference to FIGS. 5, 6, and 7A through 7D.

As is indicated in FIG. 6, buttress blocks 10 and 11 are installed around the periphery of the construction space 2 to clamp the foot of each wall 4 from the outer and inner sides thereof as foundation for installing the wall enclosure 4. These outer and inner buttress blocks 10 and 11 may be installed integrally with the floor of the construction space 2, or, by utilizing anchor means 12 and 13, separate buttress blocks may be fixed in place by a method such as bolting. In this connection, it is important to make the outer buttress block 10 amply strong since most of the force due to water pressure will be applied directly thereto.

The foot of each part of the wall enclosure 4 is then placed between the outer and inner blocks 10 and 11 thus installed, and spacers 14 such as wedges are forced into the space between the foot and the inner block 11 thereby to fix the foot. Prior to this step, means such as a packing 15 of high strength to withstand pressure is installed beforehand between the outer block 10 and the foot of each wall part. Furthermore, when necessary, embedded packings 16 can also be installed beforehand. Since the packing 15 is subjected to water pressure tending to force it upward, it is necessary to provide means for preventing the outer block 10 from rising.

The upper part of each wall of the wall structure 4 thus set in place is held by bracing struts 17 which will not buckle under the load imposed thereon. The lower ends of these bracing struts 17 are held by support fittings 18 installed on the foundation, while the upper ends of the bracing struts 17 are connected to brackets 19 fixed to the upper parts of the wall enclosure 4. The support fittings 18 may be installed beforehand integrally with the foundation, or they may be installed by utilizing anchor means 20.

As indicated in FIG. 5, the wall enclosure 4 is built by assembling in consecutive edge-to-edge arrangement a plurality of wall panels or segments 4A, 5B, 4C, 4D, . . ., each of which is a division of the entire enclosure of a size which will facilitate erection and subsequent dismantling of the wall enclosure 4.

Figure 7A:
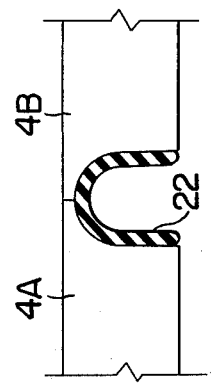
FIGS. 7A through 7D are fragmentary, relatively enlarged plan views respectively showing different examples of packings between wall panels.
Figure 7B:
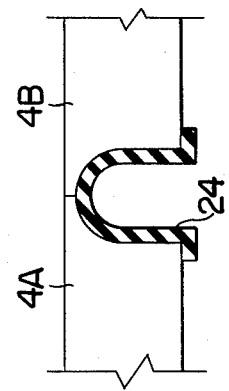
Figure 7C:
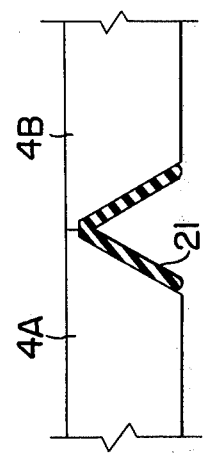
Figure 7D:
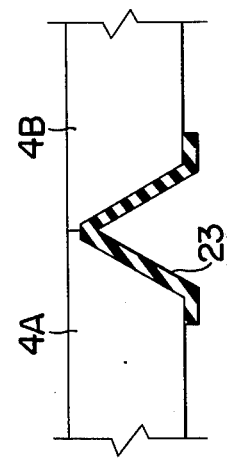

When a wall enclosure 4 is thus assembled with the wall segments 4A, 4B, 4C, 4D, . . . , each edge joint between adjacent segments is sealed against leakage of water by a molded packing 21. Specific examples of preferred packings are a packing 21 of a Vee-shaped cross section as shown in FIG. 7A, a U-shaped packing 22 as shown in FIG. 7B, a Vee-shaped packing 23 with edge flanges as shown in FIG. 7C, and a U-shaped packing 24 with edge flanges as shown in FIG. 7D. In any case, a desirable shape of the packing is such that, upon being subjected to water pressure, the packing will be pressed with great force against the wall joint thereby to afford great water retention. In some cases, water may penetrated and force its way between the packings and the wall, whereby the water holding effect of the packings decreases. When there is such a possibility, the packings can be held against the wall with material such as adhesive tape.

As was mentioned hereinbefore, it is not necessary that the wall enclosure 4 be completely leakproof. The only requirement is that the rate of leakage will not exceed the flow rate of water supply.

Thus, in accordance with this invention as described above, a large and heavy structure can be moved safely and rapidly, with relatively simple equipment and devices and with very little external force, in a manner which was impossible by conventional methods.

I claim:

1. A method for moving a built structure from a first position to a second position both on a common supporting surface, which method comprises installing on the supporting surface a water-retaining enclosure to surround commonly the built structure at the first position and the second position, supplying water into the enclosure thereby to raise the built structure by flotation off the supporting surface, applying force to move the built structure in the raised state to a position immediately above the second position, and removing the water out of the enclosure thereby to cause the built structure to descend onto the second position, said enclosure comprising: a plurality of wall panels erected on the ground and joined edge-to-edge at their sides; inner and outer buttress blocks clamping therebetween the foot edges of said wall panels and anchored to the ground; said blocks extending along the entire wall panels; edge-to-edge joint means each provided between adjacent wall panels and each including leak-resisting packing means adapted to be pressed by water pressure in the enclosure against two adjoining side edges of adjacent two wall panels, and a brace strut having one end secured to an upper part of each wall panel and having another end secured to the ground outside the wall panel.

2. The method of claim 1, wherein each of said edge-to-edge joint means comprises vertical groove means formed between adjacent wall panels and opening inwardly of the enclosure, the inner said groove means having an inner surface lined with said leak-resisting packing means.

3. The method of claim 2, wherein said groove means has a V-shaped cross-section.

4. The method of claim 2, wherein said groove means has a U-shaped cross-section.

5. The method of claim 2, wherein said leak-resisting packing means has edge flanges in sealing contact with the inner surfaces of adjacent wall panels at both sides of the associated groove means.

6. The method of claim 1, including a spacer wedge disposed between each of the inner buttress blocks and the associated wall panel.

7. The method of claim 1, including a packing disposed between each of the outer buttress blocks and the associated wall panel.

8. The method of claim 7, including packings embedded in each of the outer buttress blocks at a surface thereof facing the outer wall of the associated wall panel.

* * * * *